United States Patent [19]

Schmidt

[11] 4,103,179

[45] Jul. 25, 1978

[54] APPARATUS FOR STIMULATED EMISSION OF COHERENT, CONTINUOUSLY TUNABLE RAMAN RADIATION

[75] Inventor: Werner Schmidt, Aalen, Germany

[73] Assignee: Lambda Physik GmbH & Co. KG, Germany

[21] Appl. No.: 488,404

[22] Filed: Jul. 15, 1974

Related U.S. Application Data

[63] Continuation of Ser. No. 314,462, Dec. 12, 1972, abandoned.

[30] Foreign Application Priority Data

Dec. 13, 1971 [DE] Fed. Rep. of Germany ....... 2161743

[51] Int. Cl.$^2$ ............................................. H03F 7/00
[52] U.S. Cl. .............................. 307/88.3; 331/94.5 R
[58] Field of Search ...................... 307/88.3; 321/69 R

[56] References Cited

U.S. PATENT DOCUMENTS

| | | | |
|---|---|---|---|
| 3,358,243 | 12/1967 | Collins et al. | 331/94.5 |
| 3,371,265 | 2/1968 | Woodbury et al. | 307/88.3 |
| 3,422,370 | 1/1969 | Collins | 331/94.5 |
| 3,536,931 | 10/1970 | Boyd et al. | 307/88.3 |

Primary Examiner—Rudolph V. Rolinec
Assistant Examiner—Darwin R. Hostetter
Attorney, Agent, or Firm—Hopgood, Calimafde, Kalil, Blaustein & Lieberman

[57] ABSTRACT

The invention contemplates a combination of laser source and Raman cell construction whereby a wide uninterrupted spectrum of radiation is obtainable, providing Stokes-Raman emission which extends from the laser-radiation wavelength and far into the infrared region. This is achieved by devising a laser-radiation spectral capability which spans a wavelength range corresponding to the Raman displacement for the particular cell.

9 Claims, 3 Drawing Figures

APPARATUS FOR STIMULATED EMISSION OF COHERENT, CONTINUOUSLY TUNABLE RAMAN RADIATION

This is a continuation of application Ser. No. 314,462, filed Dec. 12, 1972 now abandoned.

The present invention relates to an apparatus for producing stimulated emission of coherent, continuously tunable Raman radiation, particularly in the IR region, consisting of an optical transmitter with stimulatable medium, optical resonator and pumping means for exciting the medium, and of a resonator filled with Raman-active material and in which the light of the transmitter is shifted from the frequency $\nu$ by a fixed amount $\Delta\nu$.

Continuously tunable coherent IR radiations have for some time constituted an intensive goal of research, since they permit a high power of resolution in optical investigations and thus permit the development of novel, extremely capable IR-spectroscopic processes and instruments which, for example, permit accurate detection of the molecules present as injurious substances in the atmosphere. Chemical reactions can also be affected in specific fashion by the feeding of defined energies of activation by means of continuously tunable IR lasers.

Certain methods are already known for the production of coherent radiation of tunable wavelengths which extend in the near IR region. Thus, for instance, a laser emission can be obtained from dyestuff molecules, and the emission band may be narrowed and continuously tuned with suitable wavelength selectors. In this way, laser emission of between 350 and 1200 nm can be produced. It is furthermore known, by the irradiation of intense laser light of fixed wavelengths into suitable media, to produce stimulated Raman emission in the IR region as well as in the shorter-wave region. In this connection, the frequency of the Raman light is displaced from the irradiated light by a fixed amount $\Delta\nu$ which is dependent on the medium and which corresponds to a given energy transfer in the Raman medium. With a Stokes-Raman displacement, the Raman light is displaced toward the lower frequencies and with an anti-Stokes Raman displacement, the Raman light is displaced toward the higher frequencies. The stimulated Raman light can in its turn cause stimulated Raman dispersion. The frequency of this stimulated Raman emission in the second stage is displaced by the amount $2\Delta\nu$ from the irradiated laser frequency. This process can be repeated several times so that frequency shifts of $n\Delta\nu$ can be produced, n being a whole number. The disadvantage of the known methods resides in the fact that either the emission range is not sufficiently wide or that in the stimulated Raman emission only discrete Raman lines are produced, or else that they are very complicated in their practical use.

The object of the present invention is therefore to provide a Raman laser which is continuously tunable within a wide range, and particularly in the IR region, and is nevertheless simple in construction and uncomplicated in its technical handling. This object is achieved in accordance with the invention by using as transmitter at least one laser which emits in a wide wavelength range with small line width, preferably a dyestuff laser, and the radiation of which is continuously tunable within a wavelength range the width of which corresponds to the Raman displacement, and by furthermore providing in the Raman resonator means which make the selection of a given Raman stage possible.

As Raman media both gases and liquids can be used, as well as media in which electronic Raman dispersion takes place. Hydrogen which is under variable pressure is used to particular advantage as Raman medium, since it supplies a wide range for the Raman displacement and is practically free of dispersion and absorption. The intensity of the Raman dispersion is dependent on pressure within certain limits.

For a good utilization of the exciting light and to enable selection of wavelength of the Raman light, it is advantageous to provide the mirror for the Raman resonator with wavelength-dependent absorption and reflection characteristics. In one illustrative embodiment of the invention, the first mirror of the Raman cell in the direction of the impinging exciting light is pervious to the wavelength of the exciting light and reflective for the wavelength of the stimulated Raman light, while the second mirror reflects back the light serving for the exciting of the desired Raman stage (which consists of the primary laser light and stimulated Raman light of other stages) and is partially pervious for the wavelength of the desired stage of the Raman light.

For the production of stimulated Raman emission in $H_2$, it is advantageous to transmit by using three dyestuff lasers whose ranges of emission overlap and which cover a wavelength range which just corresponds to the Raman displacement in $H_2$. For the applicable corresponding exciting-radiation range of 530 to 678 nm, there are available particularly strong flash-lamp-pumped dyestuff lasers operating, for instance, with fluorescein, rhodamine 6G or cresyl violet, with which this range can be covered without a gap. When using $H_2$ as Raman medium, in which the frequency displacement in the wave-number scale is 4160 $cm^{-1}$, the first four stages of Stokes-Raman emission produced with such lasers can cover the entire spectral range of 678 nm up to the far IR, while the anti-Stokes Raman emission ranges from 530 to 282 nm. This circumstances is shown in the following table, for excitation wavelengths of 530 and 678 nm.

Table

| | Wavelength in nm | |
|---|---|---|
| Exciting laser | 530 | 678 |
| Stokes Raman emission in $H_2$ | | |
| 1st stage | 678 | 947 |
| 2nd stage | 947 | 1560 |
| 3rd Stage | 1560 | 4440 |
| 4th stage | 4440 | ($\infty$) |
| Anti-Stokes Raman emission | | |
| 1st stage | 433 | 530 |
| 2nd stage | 368 | 433 |
| 3rd stage | 319 | 368 |
| 4th stage | 282 | 319 |

The advantages obtained with the invention consist in particular in the fact that the method proposed is relatively simple to carry out, that high intensities of the Raman dispersion are obtainable since the conversion yields are very high; in particular, the invention provides a coherent source of light which is tunable within a wide spectral range which extends from the visible range both into the far IR range and into the near UV range.

Embodiments of the invention are shown schematically in the drawing and will be described in detail below. In the drawing.

Figure 1:
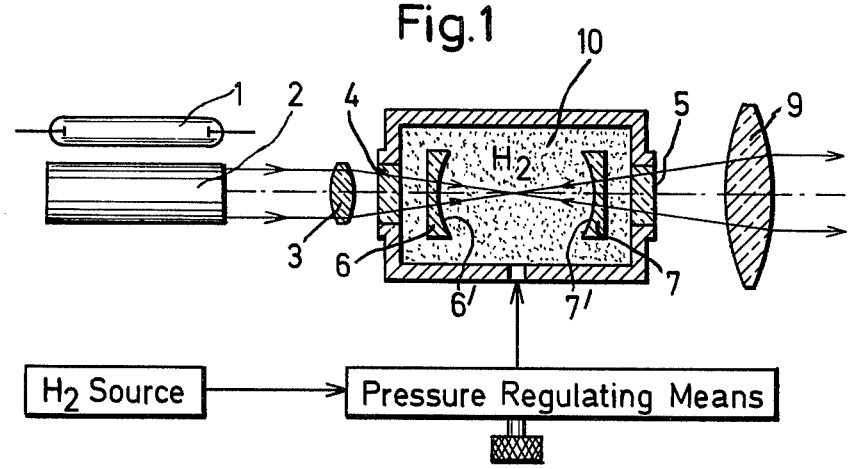
FIG. 1 shows schematically the construction of an embodiment of the invention in which the resonator mirrors of a Raman cell are arranged within the cell.

In FIG. 1, 1 is a pumping light source for a dyestuff laser 2. A collecting lens 3 focuses light coming from the laser 2 within a Raman cell 10 filled with $H_2$. In order to control the intensity of the Raman dispersion, the cell may be kept under desired pressure, for instance between 20 and 150 atm.ga. by the selectively variable means shown and identified by legend in the drawing. 4 and 5 are the windows of the Raman cell. For window 4 there is preferably used material which is permeable to the exciting radiation of the laser 2, while IR-permeable material is used for the window 5. The mirror 6 is covered on its surface 6' with a coating which reflects the Raman light and passes the excitation light coming from the laser 2, while the surface 7' of the mirror 7 is covered with a coating which reflects the exciting light and partially passes the Raman light of the desired stage so that it passes through the window 5 onto the collecting lens 9 and is fed from there to the purpose of use.

Figure 2:
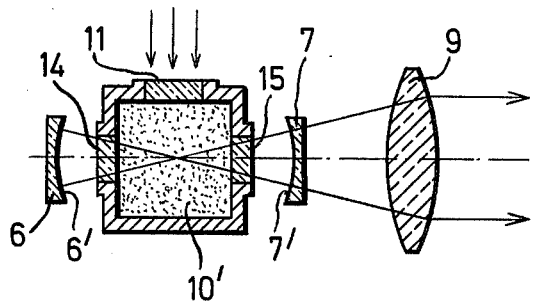
FIG. 2 shows a Raman cell for the apparatus of the invention in which the exciting radiation is radiated in transversely and the resonator mirrors are arranged outside the cell.

In the embodiment of a Raman cell shown in FIG. 2, the exciting light passes perpendicularly to the optical axis of the mirrors 6 and 7 through the window 11 into the cell 10'. The windows 14 and 15 are IR-permeable. The mirror 6 is so coated with a mirror coating 6' that it reflects the Raman light practically completely, while the mirror 7 is partially pervious to the Raman light.

Figure 3:
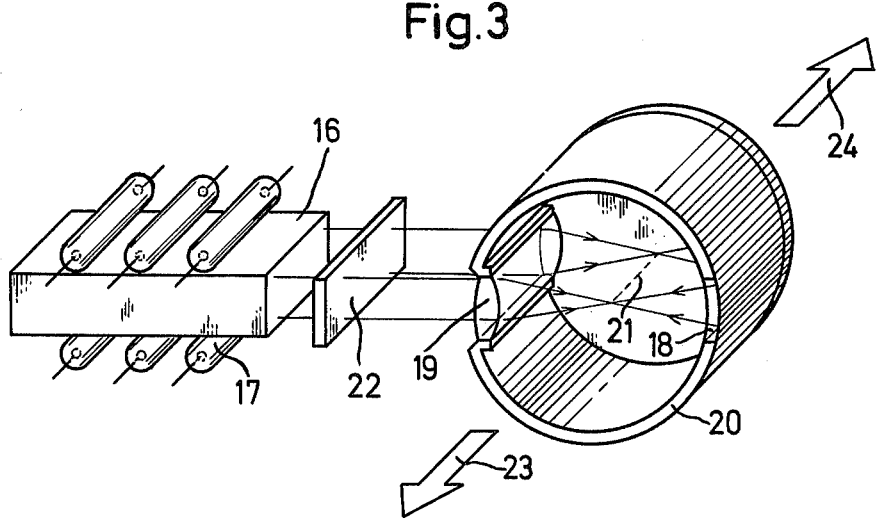
FIG. 3 is a simplified and partly broken-away perspective showing of another embodiment of the invention.

In the embodiment of the invention shown in perspective in FIG. 3, a rectangular laser cup 16 is arranged between a plurality of flash lamps 17, serving as the pumping light source. 22 is a device, such as a tiltable interference filter, for constricting the emission and for tuning the wavelength. Laser light emerges in the form of a wide beam which is collected by a cylindrical lens 19 in the focal line 21 within the Raman cell 20; in cell 20, end-wall side windows and the resonator mirrors have been omitted for greater ease in understanding of the drawing. The stimulated Raman light can leave the cell in the directions 23 and 24, it being understood that the internal cylindrical mirror 18 is reflective for the exciting laser light.

What is claimed is:

1. Apparatus for producing coherent radiation which is continuously tunable over the wavelength range from the UV to the far IR, said apparatus comprising a resonator including wavelength-selection means and filled with a Raman-active medium which will displace stimulating radiation from a frequency $\nu$ by a fixed amount $\Delta\nu$, an optical stimulator for said resonator comprising at least one dye laser and having an output radiation characteristic which is continuously tunable with small-line width over the frequency range $\Delta\nu$, and selectively operable means for tuning within said range and with small-line width the transmission of light from said laser to said medium.

2. Apparatus according to claim 1, in which the Raman resonator includes mirrors with preselected wavelength-dependent reflection and absorption characteristics.

3. Apparatus according to claim 1, in which hydrogen is the Raman medium.

4. Apparatus according to claim 3, and including means for selectively varying the pressure of said medium.

5. Apparatus according to claim 1, in which the Raman resonator includes opposed convergent mirrors one of which is pervious to infrared radiation.

6. Apparatus for producing coherent radiation which is continuously tunable over the wavelength range from the UV to the far IR, said apparatus comprising a resonator including wavelength-selection means and filled with a Raman-active medium which will displace stimulating radiation from a frequency $\nu$ by a fixed amount $\Delta\nu$, an optical stimulator for said resonator comprising at least one dye laser and having an output radiation which is continuously tunable with small-line width over a wavelength range which covers the Raman displacement of said Raman-active medium, and selectively operable means for tuning within said range and with small-line width the transmission of light from said laser to said medium.

7. Apparatus for producing coherent radiation which is continuously tunable over the wavelength range from the UV to the far IR, said apparatus comprising a resonator including wavelength-selection means and filled with a Raman-active medium which will displace stimulating radiation from a frequency $\nu$ by a fixed amount $\Delta\nu$, an optical stimulator for said resonator comprising at least one dye laser and having an output radiation which is continuously tunable with small-line width over a wavelength range which covers the Raman displacement of said Raman-active medium, and selectively operable means for effecting such tuning.

8. Apparatus according to claim 7, in which said selectively operable tuning means includes a tiltable interference filter.

9. A continuously tunable optical transmitter for generating coherent Raman radiation extending into the infrared region, comprising an optical Raman resonator containing a Raman-active medium and an optical source directionally positioned to produce Raman radiation by stimulating said medium to displace stimulating coherent radiation of a frequency $\nu$ by an amount $\Delta\nu$, said source comprising an optical resonator including a dye laser, and said source being continuously tunable with small-line width over the frequency range $\Delta\nu$.

* * * * *